(12) United States Patent
Roldan Cuenya et al.

(10) Patent No.: US 8,309,489 B2
(45) Date of Patent: Nov. 13, 2012

(54) THERMALLY STABLE NANOPARTICLES ON SUPPORTS

(75) Inventors: Beatriz Roldan Cuenya, Orlando, FL (US); Ahmed R. Naitabdi, Paris (FR); Farzad Behafarid, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 180 days.

(21) Appl. No.: 12/818,928

(22) Filed: Jun. 18, 2010

(65) Prior Publication Data

US 2010/0323884 A1 Dec. 23, 2010

Related U.S. Application Data

(60) Provisional application No. 61/218,285, filed on Jun. 18, 2009.

(51) Int. Cl.
*B01J 23/00* (2006.01)
*B01J 21/00* (2006.01)

(52) U.S. Cl. ........ 502/339; 502/182; 502/183; 502/184; 502/185; 502/332; 502/333; 502/334; 502/350; 502/351; 502/355; 502/415; 502/439; 977/773; 977/775

(58) Field of Classification Search .......... 502/182–185, 502/332, 333, 334, 339, 350, 351, 355, 415, 502/439; 977/773, 775
See application file for complete search history.

(56) References Cited

U.S. PATENT DOCUMENTS

| | | | |
|---|---|---|---|
| 7,276,640 B2 * | 10/2007 | Mulukutla et al. | 588/313 |
| 7,384,879 B2 * | 6/2008 | Roberts et al. | 438/758 |
| 7,449,237 B2 * | 11/2008 | Chan et al. | 428/403 |
| 7,625,420 B1 * | 12/2009 | Kodas et al. | 75/252 |
| 7,713,350 B2 * | 5/2010 | Yadav | 106/404 |
| 7,718,155 B2 * | 5/2010 | Zhang et al. | 423/445 R |
| 7,718,156 B2 * | 5/2010 | Zhang et al. | 423/445 R |
| 7,727,931 B2 * | 6/2010 | Brey et al. | 502/344 |
| 7,754,644 B2 * | 7/2010 | Ogawa | 502/185 |
| 7,776,779 B2 * | 8/2010 | Joo et al. | 502/180 |
| 7,799,726 B2 * | 9/2010 | Pham-Huu et al. | 502/180 |
| 7,803,498 B2 * | 9/2010 | Dressick et al. | 429/524 |
| 7,811,959 B2 * | 10/2010 | Lee et al. | 502/180 |

(Continued)

OTHER PUBLICATIONS

Beatriz Roldan Cuenya, et al., "Solving the Structure of Size-Selected Pt Nanocatalysts Synthesized by Inverse Micelle Encapsulation", Journal of the American Chemical Society, Article ASAP, Jun. 7, 2010.

(Continued)

*Primary Examiner* — Cam N. Nguyen
(74) *Attorney, Agent, or Firm* — Jetter & Associates, P.A.

(57) ABSTRACT

An inverse micelle-based method for forming nanoparticles on supports includes dissolving a polymeric material in a solvent to provide a micelle solution. A nanoparticle source is dissolved in the micelle solution. A plurality of micelles having a nanoparticle in their core and an outer polymeric coating layer are formed in the micelle solution. The micelles are applied to a support. The polymeric coating layer is then removed from the micelles to expose the nanoparticles. A supported catalyst includes a nanocrystalline powder, thin film, or single crystal support. Metal nanoparticles having a median size from 0.5 nm to 25 nm, a size distribution having a standard deviation $\leq 0.1$ of their median size are on or embedded in the support. The plurality of metal nanoparticles are dispersed and in a periodic arrangement. The metal nanoparticles maintain their periodic arrangement and size distribution following heat treatments of at least 1,000° C.

12 Claims, 5 Drawing Sheets

U.S. PATENT DOCUMENTS

| | | | |
|---|---|---|---|
| 7,816,006 B2 * | 10/2010 | Yadav et al. | 428/402 |
| 7,846,862 B2 * | 12/2010 | Mei et al. | 502/300 |
| 7,858,550 B2 * | 12/2010 | Dressick et al. | 502/101 |
| 7,871,738 B2 * | 1/2011 | Stamenkovic et al. | 429/524 |
| 7,875,569 B2 * | 1/2011 | Roev et al. | 502/180 |
| 7,887,771 B2 * | 2/2011 | Sun et al. | 423/445 R |
| 7,902,104 B2 * | 3/2011 | Kalck et al. | 502/66 |
| 7,955,755 B2 * | 6/2011 | McGrath et al. | 429/524 |
| 7,968,488 B2 * | 6/2011 | Arps et al. | 502/185 |
| 8,058,202 B2 * | 11/2011 | Brady et al. | 502/184 |
| 8,062,552 B2 * | 11/2011 | Adzic et al. | 252/500 |
| 8,124,043 B2 * | 2/2012 | Harutyunyan et al. | 423/447.1 |
| 2003/0207112 A1 * | 11/2003 | Yadav | 428/402 |
| 2004/0139820 A1 * | 7/2004 | Kodas et al. | 75/252 |
| 2006/0068080 A1 * | 3/2006 | Yadav et al. | 427/8 |
| 2008/0204742 A1 * | 8/2008 | Halas et al. | 356/301 |
| 2009/0202816 A1 * | 8/2009 | Schlenoff | 428/331 |
| 2009/0311556 A1 * | 12/2009 | Ganapathiraman et al. | 428/800 |
| 2010/0055462 A1 * | 3/2010 | Cao | 428/403 |
| 2010/0135937 A1 * | 6/2010 | O'Brien et al. | 424/59 |
| 2010/0273091 A1 * | 10/2010 | Brey et al. | 429/513 |
| 2010/0330368 A1 * | 12/2010 | Prud'homme et al. | 428/403 |
| 2011/0053020 A1 * | 3/2011 | Norton et al. | 429/425 |

OTHER PUBLICATIONS

Jason R. Croy, et al., "Size-selected Pt Nanoparticles Synthesized via Micelle Encapsulation: Effect of Pretreatment and Oxidation State on the Activity for Methanol Decomposition and Oxidation", Catal Lett (2009), vol. 131, pp. 21-32.

* cited by examiner

Method 100

THERMALLY STABLE NANOPARTICLES ON SUPPORTS

CROSS REFERENCE TO RELATED APPLICATIONS

This application and the subject matter disclosed herein claims the benefit of Provisional Application Ser. No. 61/218, 285 entitled "THERMALLY STABLE NANOPARTICLES AND ARTICLES HAVING PATTERNED SUBSTRATE SURFACES THEREFROM", filed Jun. 18, 2009, which is herein incorporated by reference in its entirety.

STATEMENT REGARDING FEDERALLY SPONSORED RESEARCH

The United States Government has rights in this invention pursuant to Office of Basic Energy Sciences, U.S. Department of Energy contract DE-FG02-08ER15995.

FIELD OF THE INVENTION

Disclosed embodiments are related to nanoparticle synthesis and nanoparticles on supports.

BACKGROUND

A conventional method for forming nanoparticle coated substrate surfaces is physical evaporation in vacuum, such as to form metal (e.g., Pt) nanoparticles on a titania substrate for catalyst applications. It is known that metal nanoparticles formed using physical evaporation display sintering temperatures well below the melting point of the metal, such as <450° C. in the case of Pt which has a melting point of about 1773° C. This low sintering temperature behavior is generally a problem for catalysis applications such as for automotive catalysts, removal of NOx from turbines, as well as for the decomposition of $H_2SO_4$ for power generation, where the typical operating temperature is well above 450° C.

Sintering is known to increase the size of the nanoparticles, which can be problematic because for structure-sensitive catalytic reactions there is a known relation between the catalytic activity and the nanoparticle size, with smaller nanoparticles being more catalytically active. In addition, annealing generally results in encapsulation of the nanoparticles by a layer of the substrate material (e.g., titania), which reduces the catalytic activity. Accordingly, new methods and catalysts resistant to coarsening at higher temperature are needed.

SUMMARY

Disclosed embodiments include inverse micelle-based methods for forming nanoparticles on supports that include dissolving a polymeric material in a solvent, where polymeric micelles are formed to provide a micelle solution. A nanoparticle source is dissolved in the micelle solution. A plurality of loaded micelles having a nanoparticle ion (e.g., metal ion) core and an outer polymeric coating layer that includes a plurality of polymeric ligands are formed in the micelle solution. A plurality of loaded micelles are applied to a surface of a support. The polymeric coating keeps the nanoparticles apart and thus prevents their agglomeration, both as applied to a support, and through annealing, as well as to control the interparticle spacing.

The polymeric coating layer is then removed from the loaded micelles while forming nanoparticles from the nanoparticle ion cores, wherein at least a portion of the nanoparticles are exposed. The disclosed micelle-based methods can be used to prepare nanoparticles having narrow size distributions, homogeneous dispersions (e.g., periodicity, such as hexagonal periodicity) and regular shapes on a variety of support materials and support types including nanocrystalline powder supports, thin film and single crystal supports.

Disclosed embodiments also include supported catalysts that are resistant to higher temperatures that comprise a support including a nanocrystalline powder, a thin film, or a single crystal. A plurality of metal nanoparticles having a median size from 0.5 nm to 25 nm, such as 0.5 nm to 5 nm, a narrow size distribution having a standard deviation $\leq 0.1$ of the median size are disposed on or embedded in the support. The plurality of metal nanoparticles are dispersed from one another and positioned in a periodic arrangement having an interparticle spacing (center-to-center) that is generally between 10 and 150 nm, such as a 10 to 50 nm spacing. The plurality of metal nanoparticles maintain their periodic arrangement and size distribution following heat treatments of at least 1,000° C., such as at least 1,060° C.

DETAILED DESCRIPTION

Figure 1:
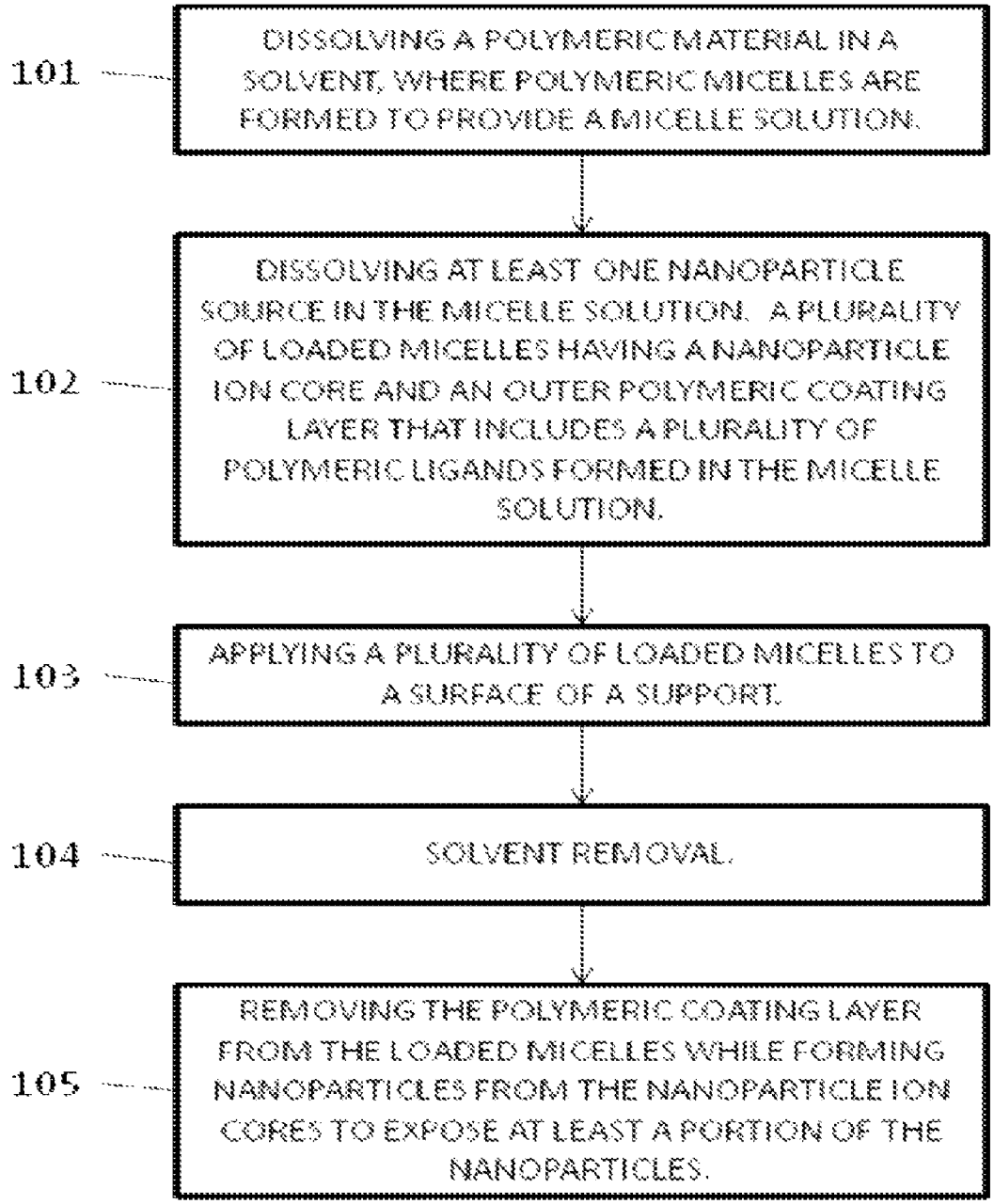
FIG. 1 is a flow chart showing an inverse micelle-based method for forming nanoparticles on supports, according to an embodiment of the invention.

Embodiments of the invention are described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. Embodiments of the invention are not limited by the illustrated ordering of acts or events, as some acts may occur in different orders and/or concurrently with other acts or events. Furthermore, not all illustrated acts or events are required to implement a methodology in accordance with embodiments of the invention.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

FIG. 1 is a flow chart showing an inverse micelle-based method 100 for forming nanoparticles on supports, according to an embodiment of the invention. Using disclosed methods, the nanoparticles can be deposited on generally any support to provide a uniform 2D nanoparticle arrangement thereon. The Inventors have discovered that the nanoparticles prepared using disclosed inverse micelle comprising methods (e.g., Pt nanoparticles) are thermally stable up to an unexpectedly high temperature, typically not detectably sintering upon annealing at a high temperature, such as at least 1,000° C. (e.g., 1060° C.) in the case of Pt nanoparticles. This is in strong contrast with respect to Pt nanoparticles of similar sizes prepared by conventional physical evaporation in vacuum (and by other known methods) that have been found to sinter which results in an increase in the size of the nanoparticles at a much lower threshold temperatures (e.g., <450° C.).

As known in the art, nanoparticles, such as metal or semiconductor nanoparticles, can be formed within the isolated phase of an emulsion. An "emulsion" is known in the art to be a stable mixture of at least two immiscible liquids. In general, immiscible liquids tend to separate into two distinct phases. An emulsion is generally stabilized by the addition of a "surfactant" which functions to reduce surface tension between the respective immiscible liquids. Commonly, emulsions comprise water and an oil (hydrocarbon). Emulsions comprise a continuous phase and a dispersed phase. The dispersed phase is the isolated phase stabilized by a surfactant. A water-in-oil (w/o) emulsions has a disperse aqueous phase and a hydrocarbon continuous phase. Alternatively, the isolated dispersed aqueous phase is referred to as a "reverse micelle" or an "inverse micelle".

Step 101 comprises dissolving a polymeric material in a solvent (or solvent mixture), where polymeric micelles are formed to provide a micelle solution. The solvents are generally non-polar solvents. One exemplary non-polar solvent is toluene. The polymeric material can be selected to prevent nanoparticle agglomeration on the nanocrystalline supports (see step 103, described below) by using block copolymers having long tail lengths (e.g., PS group in PS-P2VP), that tends to keep the nanoparticles spaced from each other a distance that is based on the tail length. In one embodiment the polymeric material comprises a polystyrene comprising block copolymer. One example of a polystyrene comprising block copolymer is polystyrene-block-poly-2-vinylpyridine (PS-P2VP). P2VP provides a hydrophilic portion and PS provides a hydrophobic tail portion. Another example is PS-P4VP. Some exemplary polymers that can also be used for the synthesis of similar nanoparticles include: poly(2-vinylpyridine)-block-poly(ethlylene oxide) (P2VP-b-PEO) and poly (acrylic acid)/polystyrene (PAA-g-PS).

Step 102 comprises dissolving at least one nanoparticle source (e.g., metal precursor) in the micelle solution. The nanoparticle source can comprise a metal salt. When bimetallic nanoparticles are desired, the nanoparticle source can comprise a first metal salt and a second metal salt different from the first metal salt. Generally any type of mono and bimetallic (or multimetallic) metal nanoparticles, or semiconductor nanoparticles can be formed by selection of appropriate salt(s). The Inventors have utilized salts to form Au, Pt, Ir, Fe, Sn, Pd, AuFe, PtFe, PtPd, PtIr, PtRu, PtAu, PtGe, PtSn, FePd nanoparticles with different alloy contents, as well as semiconducting nanoparticles (e.g., Ge, and Sn particles exposed to atomic oxygen lead to $SnO_2$ particles). Conventional metal precursors include $HAuCl_4$, $H_2PtCl_6$, $FeCl_3$, $PdCl_2$, $Pd(O_2CCH_3)_2$, etc. For example, bimetallic nanoparticles with tunable alloy content can be obtained by simultaneously adding two salts to the micelle solution, such as polymeric micelles loaded with Pt and Fe to obtain PtFe nanoparticles.

A plurality of loaded micelles having a nanoparticle ion core and an outer polymeric coating layer that includes a plurality of the polymeric ligands are formed in the micelle solution. As described herein, the polymeric coating functions to keep the nanoparticles apart and thus prevent their agglomeration, as well as to control the interparticle spacing distance.

The polymeric coating layer is generally an encapsulating (i.e. continuous) layer. The Inventors have confirmed encapsulation based on transmission electron microscopy (TEM) images taken on samples that were annealed at low temperature (e.g., 250° C.), under which conditions the polymeric coating was not removed and a continuous coating layer surrounding the nanoparticles was observed. The thickness of the polymeric coating layer is generally 2 to 75 nm thick. In one particular embodiment the thickness of the polymeric coating layer is adjusted by changing the molecular weight of the PS block of the PS comprising block polymer used as the polymeric material in the method.

Step 103 comprises applying a plurality of loaded micelles to a surface of a support. Exemplary application methods include dip coating, drop coating, or spin coating. In one embodiment the support comprises a nanocrystalline powder. In other embodiments the support comprises a thin film or a single crystal surface, where the applying generally comprises dip coating. Exemplary supports include Si, $SiO_2$, $TiO_2$, TiC, $ZrO_2$, $Al_2O_3$, $CeO_2$, MgO and quartz. Nanoparticles have been found to self-assemble on single crystal surfaces (e.g., $TiO_2(110)$, Si(111), Si(001)], thin films [$TiO_2$ (6 nm)/Ti (9 nm)/Si(001), $ZrO_2$ (15 nm, 6 nm and 3 nm)/Si (001), $Al_2O_3$ (15 nm)/Si(001), ITO] or deposited (via impregnation) on nanocrystalline powder supports (anatase-$TiO_2$, $CeO_2$, MgO, $ZrO_2$, $Al_2O_3$, $SiO_2$).

Hydrophilic supports have been generally found to lead to better nanoparticle ordering and a more homogeneous nanoparticle distribution. For example, for a support comprising pristine $SiO_2$/Si(111) wafers (not cleaned, with atmospheric water layer present on the surface) a highly periodic nanoparticle arrangement and dispersion is observed, but when the same substrates are cleaned by acetone, the surface properties change, and the nanoparticle adhesion upon dip-coating degrades, leading to coarsening or sample regions that are nanoparticle free (voids). An $O_2$-plasma treatment can be applied to the support before nanoparticle deposition to improve their subsequent adhesion and self-assembly properties.

The nanoparticles on or in the support are generally separated from one another and are referred to herein as being dispersed. The dispersion of the NPs described can be set by the length of the polymer tail, and thus be in a periodic pattern, such as by the tail provided by a PS group of a PS comprising block copolymer. In some embodiments, nanoparticles have been found by the Inventors to self-assemble in hexagonal patterns when deposited on thin film supports or single crystals and are separated from each other by the length of the polymer tail (e.g., PS) of two nearby nanoparticles. For supports such as Si, $SiO_2$, $TiO_2$, $ZrO_2$, $Al_2O_3$, MgO and quartz, substrate dip coating into the micelle solution results in a monolayer of loaded micelles homogenously distributed on the surface.

For embodiments using nanocrystalline powder supports, good nanoparticle dispersions and narrow size distributions can also be achieved by using encapsulating polymers with long tails (to separate the NPs). However, coarsening is easier on powder supports upon annealing. The Inventors have seen good dispersions (and narrow nanoparticle size distributions) on nanoparticle oxide powders of non-reducible nature (e.g. $SiO_2$, $ZrO_2$, gamma-$Al_2O_3$), and nanoparticle mobility or Ostwald-ripening leading to coarsening on reducible supports (upon annealing, oxygen vacancies are formed on these supports and such substrates seems to be worse at stabilizing the nanoparticles) such as $TiO_2$.

The size of the nanoparticles is generally 0.5 to 25 nm, and are 0.5 nm to 5 nm in one embodiment. For applications in the area of catalysis, smaller nanoparticles generally perform better. The nanoparticle size can be controlled by two parameters, namely the length of the polymer head used to form the reversed micelles, as well as the salt/polymer (e.g., metal salt/P2VP) head ratio. In addition to the formation of self-organized monodispersed nanoparticles supported on thin films (including Carbon-nanotube "bucky" paper) or single crystal substrates, this method can also be used to produce size-selected nanoparticles deposited on nanocrystalline powder substrates (such as $Al_2O_3$, $TiO_2$ and $ZrO_2$, commonly used in industrial catalysis applications) via impregnation. Advantages of this method include strong nanoparticle-support adhesion observed as well as the superior stability of such nanoscale system under thermal and chemical treatments, resulting in samples containing nanoparticles with narrow size distributions.

The shape of the nanoparticles can also be controlled. There few known methods that can be used to obtain very small nanoparticles with 3 dimensional (3D) shape. Disclosed methods allow going from 2D to 3D nanoparticles with the same average diameter, by controlling the amount of metal loading on a particular micellar material. Low loadings (low metal salt to block copolymer (e.g., P2VP) ratio, such as 0.05) have been found to lead to flatter nanoparticles, while higher loadings (such as 0.6, result in 3D clusters. This can be important in the field of catalysis since it allows overcoming nanoparticle-support interactions, normally determining the final shape of supported nanoparticles, leading to a control of the size and dispersion of nanoparticles on a substrate, as well as their shape. Normally, nanoparticles are flatter when deposited on supports showing strong NP/support interactions, and more 3D-like on weakly interacting supports. Disclosed methods allow the preparation of 2D and 3D nanoparticles on the same type of support, regardless of the strength of nanoparticle support interactions.

Step 104 comprises solvent removal. For nanoparticles on nanocrystalline powders, the solvent (e.g., toluene) can be removed by stir drying at about 50° C., such as in air. For the dip coated samples on thin films or single crystal supports, the solvent generally evaporates in air almost immediately after emerging from the solution. A slow dip-coating speed (e.g., below 200 μm/second) can be used to bring the support in and out of the solution.

Step 105 comprises removing the polymeric coating layer from the loaded micelles while forming nanoparticles from the nanoparticle ion cores, wherein at least a portion of the nanoparticles are exposed. The polymeric coating layer removal step 105 can comprise a wide variety of different processes, such as atomic oxygen or hydrogen exposure, via a plasma process such as $O_2/H_2$, ozone exposure, as well as thermal annealing in oxygen, for example at around 375 to 600° C. (e.g., 500° C.).

After removal of the polymeric coating layer (e.g., by annealing in $O_2$ or $O_2/H_2$ plasma treatments) the nanoparticles have been found to remain homogeneously dispersed on the support surface, having an interparticle distance that as described above can be set as applied to a support by the length of the tail of a block copolymer, such as by a PS block. A significant advantage of disclosed methods is the ability to obtain dense arrays of nanoparticles that are isolated from each other. The removing step 105 results in the absence of polymer derived carbon on the surface of the nanoparticles and their support, which frees up low-coordinated atomic sites at the nanoparticle surface, generally being the most catalytically active sites.

The Inventors have found that conditions used to remove the polymeric coating layer can significantly influence the resulting catalytic activity of the nanoparticles. For example, for Pt nanoparticles on nanocrystalline $ZrO_2$, four different exemplary treatments were carried out by the Inventors at 500° C. on four analogously prepared fresh samples and included calcination in: i) a flow of $O_2$ for 8 hours, ii) a flow of helium for 8 hours, iii) a flow of $H_2$ for 8 hours, and iv) a flow of $O_2$ for 4 hours followed by a flow of $H_2$ for 2 hours. All flows were 50 ml/min total with the $O_2$ and $H_2$ treatments containing 50% $O_2$ or $H_2$ respectively and balanced with helium. All gas-flow treatments were performed in a packed-bed reactor as described below. The respective samples were evaluated as catalysts for the decomposition (oxidation) of methanol.

The samples pretreated in $O_2$ were found to comprise primarily platinum oxides (PtO and $PtO_2$), while the samples pretreated in non-oxidizing atmospheres were found to comprise mainly metallic Pt ($Pt^0$. An optional $H_2$ plasma treatment can be used to reduce oxide nanoparticles. Samples pretreated in non-oxidizing atmospheres were also found to include residual C from the polymer, while the samples pretreated in $O_2$ were found to have essentially no residual C from the polymer. MeOH decomposition and oxidation reactions were measured at atmospheric pressure at a temperature of 260° C. (decomposition) and at 260° C. and 50° C. (oxidation), each for a period of 4 hours. It was observed that the $O_2$-treated samples exposed to $H_2$ before reaction are the most catalytically active for the decomposition of methanol, which may be due to promotional effects of $H_2$ in the decomposition of methoxy species.

The complete oxidation of methanol was found to take place over the catalyst in the presence of excess oxygen at 50° C. with no appreciable difference in activity for oxidized versus reduced samples and 100% conversion for all samples is obtained at 260° C. regardless of pre-treatment. This provides evidence that the oxidized surfaces for the Pt nanoparticles are active for the oxidation of methanol and reduction pre-treatments commonly reported in the literature may not be necessary. Furthermore, the oxidized surface appears to take part in a Mars van Krevelen-type of process, exchanging oxygen from the particle's Pt oxide shell with gas-phase $O_2$, allowing it to remain oxidized during/after MeOH oxidation reactions.

The above described Pt NPs (0.8 to 1 nm in diameter) supported on nanocrystalline $\gamma$-$Al_2O_3$ were also found to be good catalysts for the partial oxidation of 2-propanol to acetone at low temperature (40° C. to 80° C.) and total oxidation to $CO_2$ above 80° C. In addition, the onset temperature for 2-propanol oxidation was found to depend on the NP shape, with flatter (2D) NPs leading to the lowest onset temperatures.

The nanoparticles can be on the support surface, or at least partially embedded in the support surface depending on the support material, and the treatment of the sample. For example Si or glass supports have not shown any tendency to encapsulate a variety of different metal nanoparticles. However the well known SMSI (Strong metal-support interactions) phenomenon could result in encapsulation of the nanoparticles by a thin layer of support material. This could be the case for Pt or Pd nanoparticles supported on metal oxide supports such as $TiO_2$. Whether nanoparticle encapsulation by the oxide support occurs generally depends on the annealing treatment. For example, Pt nanoparticles on $TiO_2$(110) have not been found to become embedded in the support upon annealing at high temperature (1,000° C. in vacuum, $10^{-10}$ mbar), while on less stable supports (6 nm thick $TiO_2$ films), the same nanoparticles under similar annealing conditions can sink and become embedded in the $TiO_2$ films.

A high temperature annealing step, that is typically in the range from 900° C. to 1,200° C., can follow the polymeric coating layer removal step 105. As described below, the high temperature annealing step applied to NPs supported on thin films or single crystals can be used to pattern the surface of an oxide support to generate raised stripe regions (nanostripes or nanowires). The width of the nanostripes is commensurate with the diameter of the nanoparticles and their length can reach a couple hundreds of nanometers.

Figure 2A:
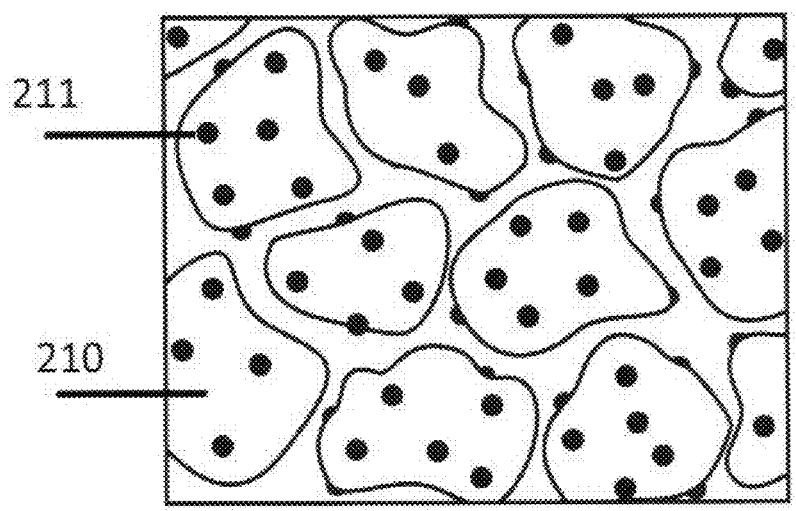
FIG. 2A is a depiction of a supported catalyst comprising a nanocrystalline powder support, having a plurality of embedded metal nanoparticles, according to an embodiment of the invention.
Figure 2B:
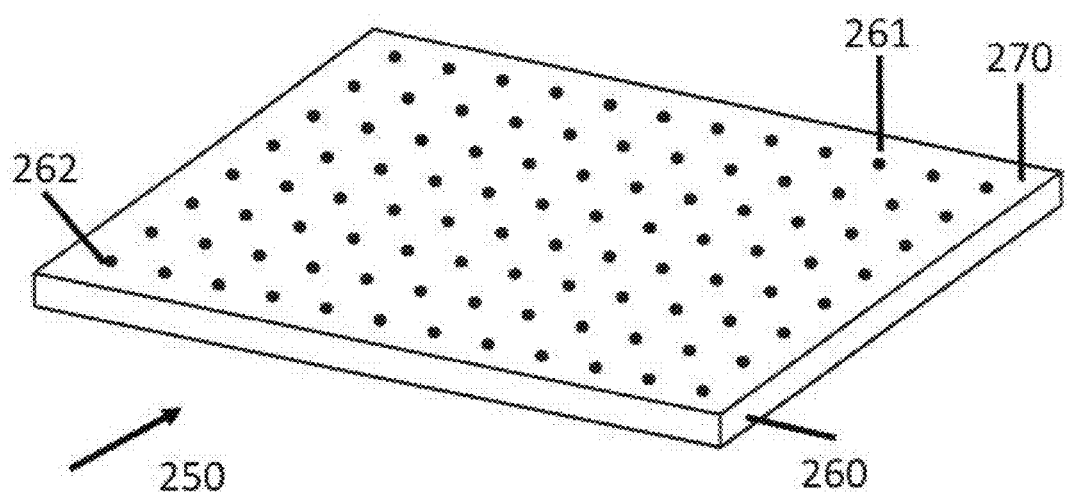
FIG. 2B is a depiction of a supported catalyst comprising a thin film or a single crystal support, having a plurality of metal nanoparticles thereon, according to an embodiment of the invention.

FIG. 2A is a depiction of a supported catalyst 200 comprising a nanocrystalline powder support comprising a plurality of nanocrystallites 210, having a plurality of at least partially embedded metal nanoparticles 211, according to an embodiment of the invention. FIG. 2B is a depiction of a supported catalyst 250 comprising a thin film or a single crystal support 260 having a support surface 270, having a plurality of metal nanoparticles 261 thereon, according to an embodiment of the invention. The plurality of metal nanoparticles 261 are shown having the same size and shape, and are arranged having a constant interparticle distance that as described above can be controlled by the length of the tail of a block copolymer used to form the micelle coating, such as by a PS tail. The arrangement shown in FIG. 2B is a hexagonal arrangement. A thin carbon comprising adhesion layer 262 (e.g. about 1 to 2 nm thick) that is derived from the polymeric micelle used in the method as described above following removal of the polymeric coating layer (step 105) is shown interposed between the metal nanoparticles 261 and the support surface 270.

The formation of such a carbon comprising adhesion layer 262 may explain the significantly enhanced adhesion between the nanoparticles and the surface of the support observed by the Inventors that significantly stabilizes the nanoparticles (e.g., prevents agglomeration). Although the presence of a carbon comprising adhesion layer 262 underneath the nanoparticles is likely because the nanoparticles 261 themselves deny access of oxygen ions to the nanoparticle/support buried region, and the polymeric carbon is thus only efficiently removed from the nanoparticle surface, this is difficult to confirm due to the shadowing effect of the nanoparticles, which strongly decreases the carbon signal detected by most surface-sensitive techniques, such as X-ray photoelectron spectroscopy. In addition to the damping effect, the coverage of the NPs on the different supports and therefore the maximum amount of residual carbon trapped underneath the NPs is usually less than 1 percent of the total substrate surface that can be investigated, and therefore, the sensitivity limits of XPS or other surface sensitive measurements are generally reached.

Another source of enhanced stability for nanoparticles disclosed herein may be related to resistance to coarsening mechanisms, namely "diffusion-coalescence" (nanoparticles moving as a whole on the support surface) or "Ostwald ripening" (small nanoparticles donating atoms to larger clusters). The first mechanism is usually effective for very small particles (below 1 nm) considering that the diffusion coefficient decreases by a power of four with increasing nanoparticle radius. If the nanoparticles are larger than 1 nm, their size (e.g., 3 nm) could prevent them against the diffusion mechanism in which nanoparticles move as entire units. In the case of the second possible coarsening mechanism (Ostwald ripening), it is believed that this process is not favorable for disclosed embodiments because of the narrow initial nanoparticle size distribution. Therefore, a narrow nanoparticle size distribution in which all the particles would have the essentially same size should not likely experience any coarsening due to Ostwald ripening. Accordingly, the narrow average nanoparticle size distribution achieved by disclosed methods could also be responsible (at least in part) for the enhanced stability and lack of coarsening observed for our NPs upon high temperature annealing (e.g., up to at least 1060° C.).

The enhanced nanoparticle stability allows nanoparticle on supports as disclosed herein to be thermally treated at elevated temperatures without observing any detectable changes in the particle size or arrangement on the surface, making them well suited for high-temperature nanotechnology applications. An exemplary stepwise isochronal sample annealing performed by the Inventors was from 300° C. to 1000° C. in 100° C. temperature intervals (20 min. at each temperature), and from 1010° C. to 1060° C. in 10° C. intervals (10 min. at each temperature), result in no observable changes in the particle size or arrangement.

One of the novelties of nanoparticles on supports described herein is the strong adhesion of the nanoparticles to generally any support material. As described above, this enhanced adhesion may be attributed to the presence of residual carbon atoms (not removed during the polymeric layer removing step 105 such as using an $O_2$-plasma treatment) underneath the nanoparticles at the nanoparticle support interface, and possibly also at the particle-support perimeter. In the case of the $TiO_2$ (110) substrate, those atoms may form an ultrathin TiC film that helps to stabilize the Pt particles. On Si(111) and Si(001), SiC can form underneath the particles upon thermal treatment after the atomic oxygen exposure. The small amounts of adhesion layer left behind by the plasma treatment (located underneath the nanoparticles) has not been found to hinder the chemical reactivity of these nanoparticles, but contributes to their stabilization, a very important property for high-temperature catalysis applications. These findings and the sample preparation method are both general, and not limited to the Pt/$TiO_2$ system generally described herein.

Disclosed embodiments can be significant for the field of catalysis for high temperature applications including automotive catalysts, such as for removal of NOx from turbines and for the decomposition of $H_2SO_4$ for $H_2$ production using the heat released by the last generation of US nuclear plants, in which higher temperate tolerant catalysts are known to be needed. Size stability of the nanoparticles being preserved at high temperature (e.g., up to 1060° C. for 1 nm Pt nanoparticles) is significant because as noted above there is a known relation between the catalytic activity and the particle size, with smaller particles being more reactive.

The Inventors have also demonstrated that inverse micelle generated nanoparticles can act as seeds during high temperature annealing and thus be used to pattern underlying support surfaces, such as oxide surfaces (e.g., the $TiO_2$ single crystal) and $TiO_2$ nanowires (high surface area materials with high reactivity). This is significant for certain catalysis applications, since such nanowires have applications for photocatalysis and gas sensing.

Figure 3:
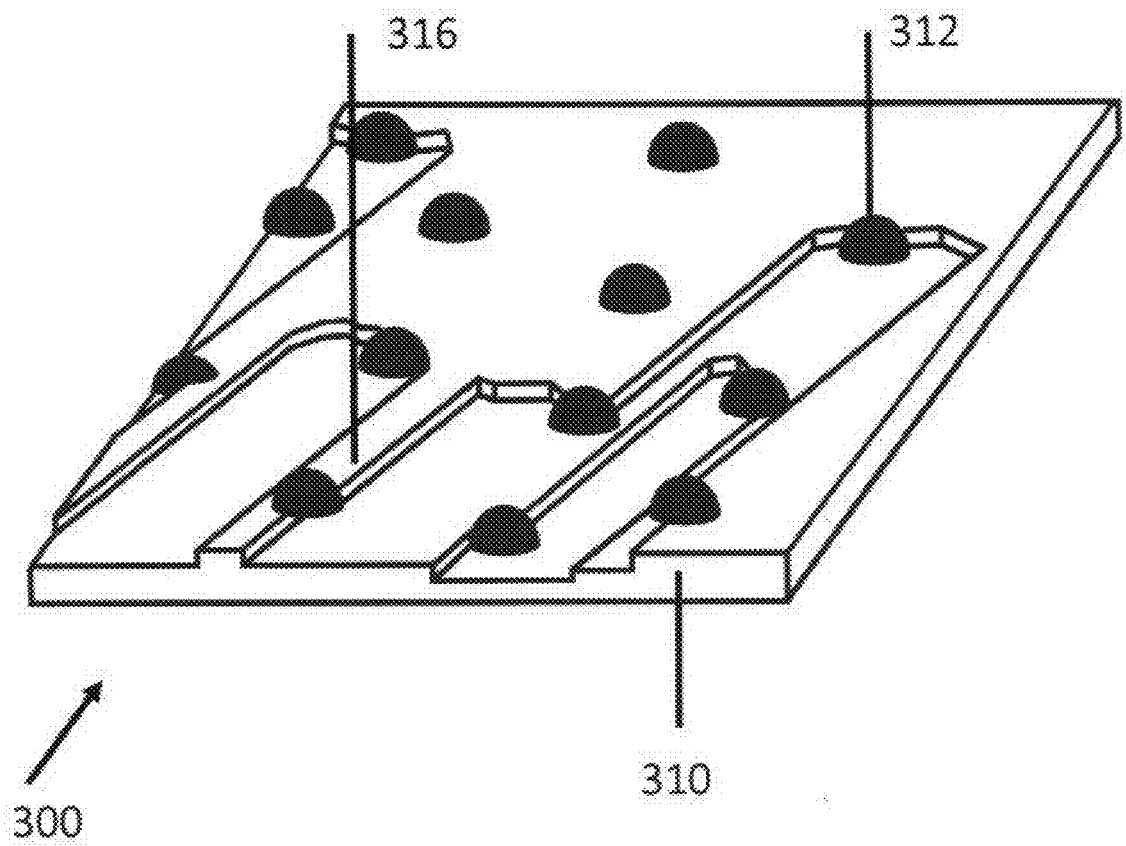
FIG. 3 shows a depiction of an oxide support having a plurality of raised oxide nanostripes induced by annealing the oxide support when micelle-based Pt nanoparticles were present on its surface, according to an embodiment of the invention.

FIG. 3 shows a depiction from a scanned image of a supported catalyst 300 comprising an oxide support 310 having a plurality of raised oxide nanostripes 316 induced by annealing with Pt or Au nanoparticles 312 on the surface of the oxide support 310 at high temperature (e.g., 1,000° C. to 1,060° C.), according to an embodiment of the invention. The formation of raised support oxide stripes 316 using high temp annealing (e.g., 1,000 to 1,060° C.) for Pt or Au nanoparticles on oxide supports such as $TiO_2$ is believed to be a unique result. Simply annealing $TiO_2$ substrates without the nanoparticles under the same annealing conditions has been found by the Inventors to not form any raised titania stripes, which demonstrates that the nanoparticles act as seeds for formation of the metal oxide stripes.

The raised oxide stripes 316 shown are raised 0.3 to 0.6 nm above surrounding portions of the oxide surface. A typical height of the oxide stripes 316 is normally around 1 or 2 monolayers of the oxide, for $TiO_2$ the height of each layer being about 3.2 Å.

Disclosed methods are simple and relatively easy to create uniform arrays of metal oxide surfaces, such as surfaces having $TiO_2$ nanowires, by only controlling the nanoparticle size and their locations on an oxide support. Although there are other techniques such as "grazing angle sputtering" that can be used to form of stripes on $TiO_2$ on supports upon sample exposure to a beam of Ar ions, such stripes are not regularly arranged on a surface, and their width cannot be controlled.

The nanowire length has been found to depend on the annealing time (for a given annealing temperature), their width on the nanoparticle diameter, and the interwire distance on the distance between the nanoparticles that were used to form these patterns. This result is believed to be unique since the formation of the stripes are induced by nanoparticles and hence can be adjusted to desired values by tuning the size and interparticle distance of the NPs.

The raised support stripes can provide an improvement in catalyst performance. The function of the support is not limited to only providing a mechanical stability for the nanoparticles. Phenomena such as charge transfer and support induced strain (leading to changes in the electronic properties of the nanoparticles) originate from nanoparticle-support interactions. Both aspects affect the catalytic reactivity. In addition, the support itself (e.g., $TiO_2$) can also be catalytically active itself. For example, $TiO_2$ wires are known photocatalysts. The support can also act as a gas absorbent and carry the gas or the catalytic intermediate products towards or away from the nanoparticles. Therefore any changes in the morphology of chemically active supports such as $TiO_2$ could affect not just their performance as catalysts, but also that of the supported nanoparticles catalysts. In general, the larger concentration of steps, kinks, and low coordinated atoms in both nanoparticles and the support is known to enhance their catalytic performance. $TiO_2$ nanostripes (or wires) have a larger content of low-coordinated, catalytically active sites (steps, corners, kink sites) than the corresponding flat $TiO_2$ terraces.

Another discovery by the Inventors is that the nanoparticles may not become encapsulated by a layer of the support upon high temperature annealing. For example, Pt nanoparticles on a $TiO_2$ single crystal support were found to not get encapsulated by $TiO_2$ upon annealing up to at least 1060° C. This is generally important, since Pt clusters prepared by conventional evaporation in vacuum and deposited on $TiO_2$ get coated by a thin layer of $TiO_x$ upon annealing which reduces catalytic activity of the nanoparticles. This result is not unique for $Pt/TiO_2$, and should be applicable for other metal-nanoparticle/metal-oxide support systems characterized by strong particle-support interactions.

Yet another discovery by the Inventors is that after annealing at high temperature, the formation of facets with different orientation is observed on the nanoparticles. This is important for applications in catalysis, since it has been previously demonstrated that high Miller index planes generally display an enhanced catalytic reactivity due to the presence of a larger number of low coordinate atoms which can act as active sites for catalytic reactions. Such facets have also been observed in nanoparticles (e.g., Pt) prepared by vacuum evaporation. However, using conventional vacuum evaporation results in flatter particles (2D) with a large diameter to height ratio (e.g., 30 nm width, 4 nm height) and a lower number of low-coordinated atomic sites. Embodiments of the invention generally produce smaller particles with 3D shape (e.g., ~6 nm width, ~3 nm height) and a higher concentration of faceted areas and low coordinate atoms.

Disclosed nanoparticle surfaced articles can be used in a wide variety of applications. For example, for high-temperature catalysis, low-cost large scale patterning of oxide surfaces to obtain nanowires, production of high surface area nanoparticles (metal or semiconductor) and high surface area nano-supports (metal oxide nanowires) in a single-step. Applications for embodiments of the invention include low and high temperature catalysis applications (e.g., an automobile's catalytic converter, turbines, etc.). Some of the catalytic systems synthesized so far have been proven to be good catalysts for CO oxidation and alcohol (methanol, ethanol, propanol and butanol) decomposition and oxidation. They also hold promise as catalysts for selective NOx reduction (one system comprises PdAu nanoparticles that can be prepared using synthesis methods according to embodiments of the invention) and for the high-temperature decomposition of sulfuric acid to produce $H_2$ ($Pt/TiO_2$) using residual heat produced by the new generation of U.S. nuclear power plants.

In addition, the large-scale and low cost patterning of oxide surfaces (e.g., $TiO_2$ or $SnO_2$ nanowire production) that can be obtained by using high-thermally stabile nanoparticles holds promise in applications related to gas sensing, photocatalysis, and other applications where the production of nanowires with tunable width and interwire distance is desired.

EXAMPLES

Embodiments of the invention are further illustrated by the following specific examples, which should not be construed as limiting the scope or content of embodiments of the invention in any way.

Figure 4A:
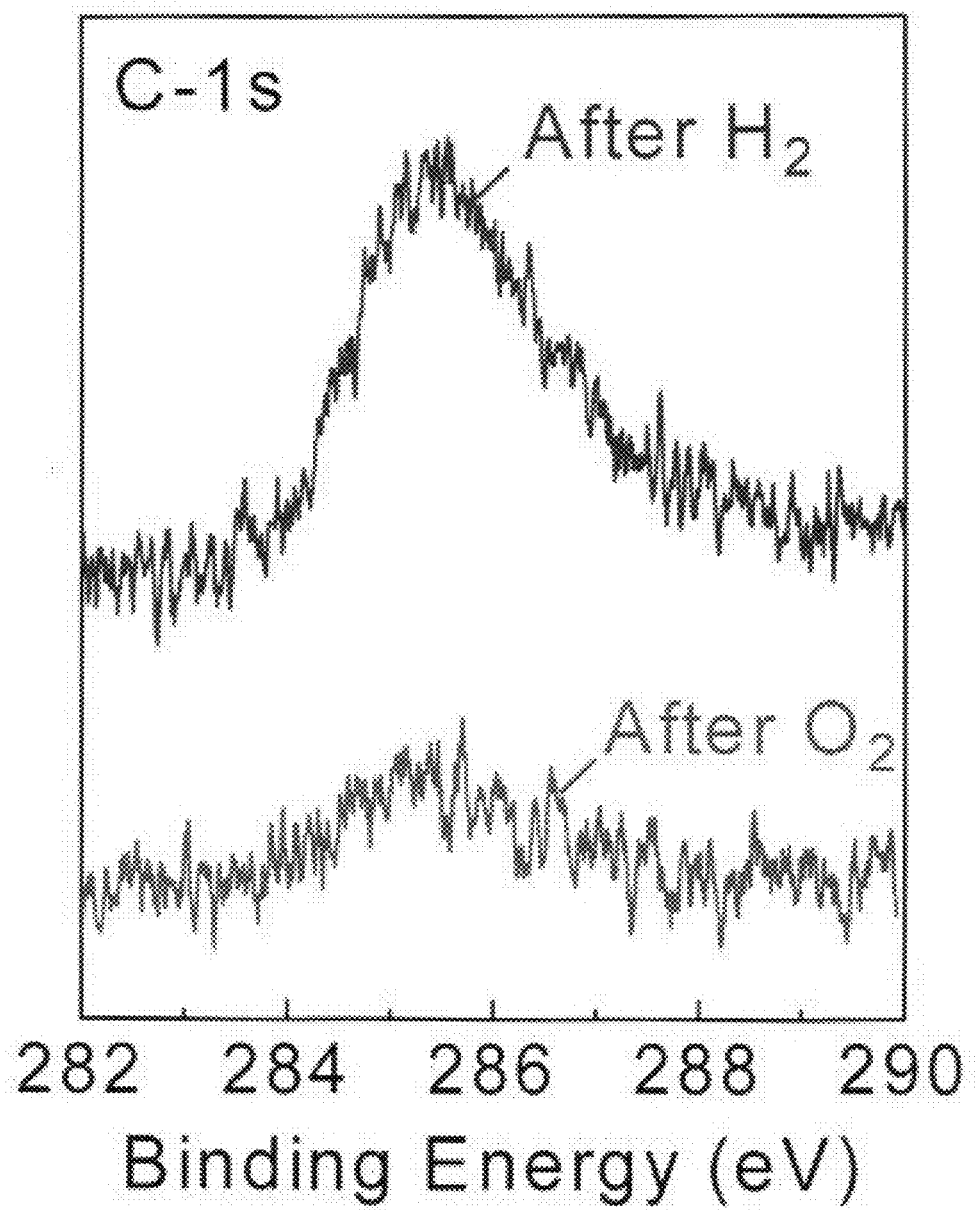
FIG. 4A provides X-ray photoelectron spectroscopy data evidencing that the encapsulating polymeric coating layer (evidenced by residual C) on Pt particles supported on nanocrystalline supports can be removed by annealing in $O_2$, but not by annealing in $H_2$, according to an embodiment of the invention.

FIG. 4A shows that the encapsulating polymeric coating (evidenced by XPS signal of residual C) on Pt nanoparticles supported on nanocrystalline supports can be removed by annealing in $O_2$, but not by annealing in $H_2$. The annealing temperature used was 500° C.

Figure 4B:
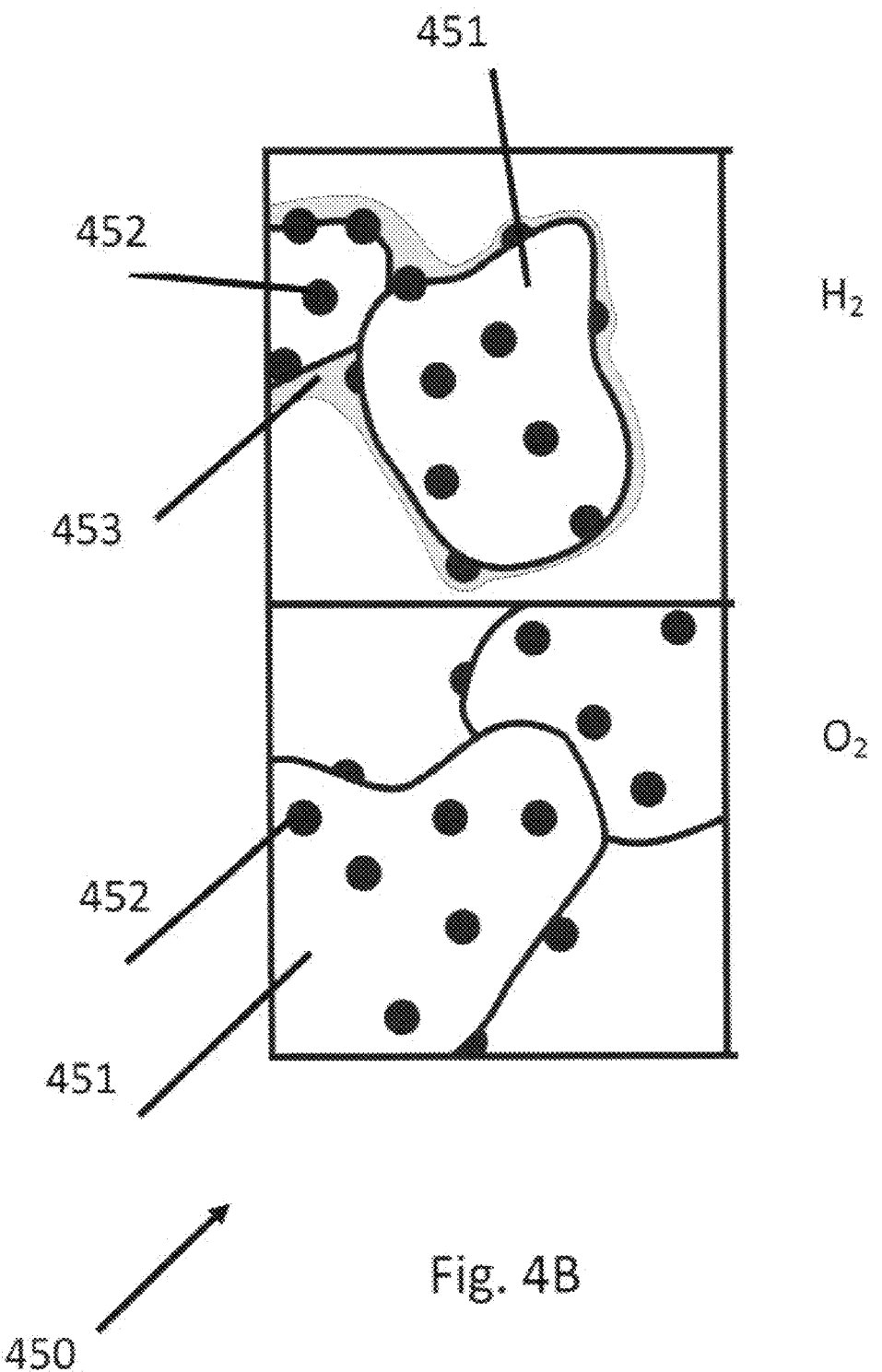
FIG. 4B is a depiction of transmission electron microscopy data showing the carbon residues (partial polymer removal) after annealing in $H_2$ and complete removal of carbon after annealing in $O_2$.

FIG. 4B is a depiction of transmission electron microscopy data 450 for Pt nanoparticles 452 supported on $ZrO_2$ 451 after annealing at 500° C. in $O_2$ and in $H_2$. The $O_2$ annealed sample is seen to be completely clean with no sign of residual carbon, but the $H_2$ annealed sample has a layer of carbon 453 which covers both the Pt nanoparticles 452 and the support 451.

While various embodiments of the invention have been described above, it should be understood that they have been presented by way of example only, and not limitation. Numerous changes to the disclosed embodiments can be made in accordance with this Disclosure without departing from the spirit or scope of the invention. Thus, the breadth and scope of this Disclosure should not be limited by any of the above described embodiments. Rather, the scope of this Disclosure should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary embodiments. In addition, while a particular feature may have been disclosed with respect to only one of several implementations, such a feature may be combined with one or more other features of the other implementations as may be desired and advantageous for any given or particular application. Furthermore, to the extent that the terms "including," "includes," "having," "has," "with," or variants thereof are used in either the detailed description and/or the claims, such terms are intended to be inclusive in a manner similar to the term "comprising."

The invention claimed is:

1. A supported catalyst, comprising:
a support comprising a nanocrystalline powder, a thin film, or a single crystal;
a plurality of metal nanoparticles having a median size from 0.5 nm to 25 nm, a size distribution having a standard deviation $\leq 0.1$ of said median size on or embedded in said support, said plurality of metal nanoparticles being dispersed from one another and positioned in a periodic arrangement.

2. The supported catalyst of claim 1, wherein said support comprises said thin film or said single crystal, and wherein said thin film or said single crystal includes a metal oxide surface.

3. The supported catalyst of claim 2, wherein said metal oxide surface comprises alumina or titania.

4. The supported catalyst of claim 3, further comprising raised metal oxide stripes on said metal oxide surface, wherein said raised metal oxide stripes are raised 0.3 to 0.6 nm above surrounding portions of said metal oxide surface.

5. The supported catalyst of claim 4, wherein said plurality of metal nanoparticles comprise Pt or Pd.

6. The supported catalyst of claim 1, wherein said plurality of metal nanoparticles have a median size from 0.5 to 5 nm.

7. The supported catalyst of claim 1, further comprising a carbon comprising adhesion layer interposed between said support and said plurality of nanoparticles that enhances adhesion between said support and said plurality of nanoparticles so that said plurality of metal nanoparticles maintain said periodic arrangement and said size distribution following heat treatments of at least 1,000° C.

8. The supported catalyst of claim 7, wherein said carbon comprising adhesion layer is about 1 to 2 nm thick.

9. A supported catalyst, comprising:
a support comprising an oxide thin film, or a single crystal having an oxide surface;
a plurality of metal nanoparticles comprising Pt or Pd having a median size from 0.5 nm to 5 nm, a size distribution having a standard deviation $\leq 0.1$ of said median size on or embedded in said support, said plurality of metal nanoparticles being dispersed from one another and positioned in a periodic arrangement.

10. The supported catalyst of claim 9, wherein said oxide comprises titania and said oxide surface comprises a titania surface, and wherein said periodic arrangement comprises hexagonal, further comprising raised titania stripes on said titania surface, wherein said raised titania stripes are raised 0.3 to 0.6 nm above surrounding portions of said titania surface.

11. The supported catalyst of claim 9, further comprising a carbon comprising adhesion layer interposed between said support and said plurality of nanoparticles that enhances adhesion between said support and said plurality of nanoparticles sufficiently so that said plurality of metal nanoparticles maintain said periodic arrangement and said size distribution following heat treatments of at least 1,000° C.

12. The supported catalyst of claim 11, wherein said carbon comprising adhesion layer is about 1 to 2 nm thick.

* * * * *